United States Patent
Schuler et al.

(10) Patent No.: US 12,263,420 B2
(45) Date of Patent: Apr. 1, 2025

(54) FILTER CARTRIDGE

(71) Applicant: BRITA SE, Taunusstein (DE)

(72) Inventors: Tobias Schuler, Dreieich (DE); Bernd Freystedt, Wiesbaden (DE)

(73) Assignee: BRITA SE, Taunusstein (DE)

( * ) Notice: Subject to any disclaimer, the term of this patent is extended or adjusted under 35 U.S.C. 154(b) by 445 days.

(21) Appl. No.: 17/775,068

(22) PCT Filed: Sep. 22, 2020

(86) PCT No.: PCT/EP2020/076394
§ 371 (c)(1),
(2) Date: May 6, 2022

(87) PCT Pub. No.: WO2021/104708
PCT Pub. Date: Jun. 3, 2021

(65) Prior Publication Data
US 2022/0387910 A1    Dec. 8, 2022

(30) Foreign Application Priority Data
Nov. 26, 2019 (EP) ...................... 19211605

(51) Int. Cl.
*B01D 27/00* (2006.01)
*B01D 27/02* (2006.01)
(Continued)

(52) U.S. Cl.
CPC ........... *B01D 27/005* (2013.01); *B01D 27/02* (2013.01); *B01D 27/08* (2013.01); *C02F 1/003* (2013.01);
(Continued)

(58) Field of Classification Search
CPC ...... B01D 27/005; B01D 27/02; B01D 27/08; B01D 2201/293; C02F 1/003; C02F 2201/003; C02F 2201/006; C02F 2307/04
(Continued)

(56) References Cited

U.S. PATENT DOCUMENTS 5,049,272 A    9/1991  Nieweg
6,841,067 B1   1/2005  Hofmann et al.
(Continued)

FOREIGN PATENT DOCUMENTS

DE    19631687 A1   2/1998
EP    1230166 B1    8/2004
(Continued)

OTHER PUBLICATIONS

Machine-generated English translation of TW-200942313, generated on Sep. 17, 2024.*

*Primary Examiner* — Fred Prince
(74) *Attorney, Agent, or Firm* — Hudak, Shunk & Farine Co. LPA

(57) ABSTRACT

A gravity-based filter cartridge having a cup-shaped upper part and a cup-shaped lower part, the upper part having a main axis (X), a first rim at a first axial end, a hole-free section at a second axial end, and at least one water inlet between the hole-free section and the first rim, the lower part having a second rim and at least one water outlet, wherein filter media is arranged in the lower part, the filter cartridge further including a mesh fixated to the upper part along a closed path, wherein the mesh is further fixated to the hole-free section radially inwards of the closed path as well as a method for manufacturing the same.

20 Claims, 4 Drawing Sheets

(51) Int. Cl.
*B01D 27/08* (2006.01)
*C02F 1/00* (2023.01)
(52) U.S. Cl.
CPC .. *B01D 2201/293* (2013.01); *C02F 2201/003* (2013.01); *C02F 2201/006* (2013.01); *C02F 2307/04* (2013.01)
(58) Field of Classification Search
USPC .......................................................... 210/282
See application file for complete search history.

(56) References Cited

U.S. PATENT DOCUMENTS

2014/0027368 A1   1/2014 Bell
2015/0041385 A1*  2/2015 Taszarek ................ B01D 35/30
                                                  210/435

FOREIGN PATENT DOCUMENTS

TW       200942313 A  * 10/2009  ............. C02F 1/003
WO   WO-2013088260 A1 *  6/2013  ............. B01D 24/22

* cited by examiner

FILTER CARTRIDGE

FIELD OF THE INVENTION

The present invention relates to a method for manufacturing a gravity-based filter cartridge, a gravity-based filter cartridge, and a gravity-based filtration device.

BACKGROUND OF THE INVENTION

Filtration devices of the above-referenced kind are being used as water filters for everyday use in households, which is why they are also called table water filters. They are primarily used for clearing tap water of unwanted substances. Among these substances are chloride and hardness builders such as calcium and magnesia, but also lead, which finds its way into tap water through the use of lead pipes, especially in older houses.

Table water filters are gravity-operated. Besides the pouring of the water, which is to be treated, into the water filter, no work is necessary for filtering the water. The water simply flows downwards through a filter cartridge and into a receptacle for the filtered water due to the gravitational force.

A filtration device known from EP1230166B1 comprises an inlet funnel having a bottom wall, which is provided with an opening for a filter cartridge. The filter cartridge is plugged into the opening, creating a seal between the opening and a sealing rim of the filter cartridge. In use, water is introduced into the inlet funnel from above and then flows into the filter cartridge through water inlets. Granular treatment media for the water is located inside of the filter cartridge. The treatment media usually comprises ion exchange resin and/or active coal, but other components may be used as treatment media as well. In the filter cartridge the water is treated and then exits the filter cartridge downwards through water outlets at the bottom of the filter cartridge. The filter cartridge is also provided with air outlets at its very top in order to allow air from inside the filter cartridge to exit the filter cartridge upwards at the beginning of the filtration process.

Inside the filter cartridge there is a mesh that prohibits the treatment media from exiting the openings (water inlets and air outlets) that are located in the head portion of the filter cartridge. The mesh is fixated to the head portion along the lower rim of the head portion. This is usually accomplished by ultrasonic welding during the manufacturing process as follows. The head portion is arranged upside down and a strip of mesh material (e.g. from a coil) is placed onto the lower rim. An ultrasonic welding die (sonotrode) is then placed on the mesh material contact area with the rim, cutting out the mesh from the mesh material and welding the mesh to the rim at the same time. The welding die also comprises a dome-shaped part for deforming the flat mesh material prior to the cutting and welding process. When the welding die is placed on the mesh, the dome-shaped part pushes the mesh downwards forcing the mesh material into a likewise dome-shaped form.

The mesh material is usually made of polyethylene terephthalate (PET), polyamide (PA), polypropylene (PP) or polyethylene (PE). Choosing the mesh size is not an easy task. On the one hand, the mesh size is supposed to be as small as possible for reducing the amount of granular treatment media exiting the filter cartridge. On the other hand, the flow resistance of the mesh increases when the mesh size is reduced. If the mesh size is too small, the flow rate through the mesh could become so small that the acceptance of the consumer for how long it takes the water to be treated will suffer. In rare cases, a very small mesh size may also lead to a complete blocking of the water flow by the mesh due to the surface tension of the water hindering the escaping of air through the water present on the mesh.

This problem has already been addressed in DE19631687A1, which discloses a gravity-operated filter cartridge. The filter cartridge has a body portion with water outlets and a head portion with water inlets and air outlets, the body portion and the head portion together forming a housing with an inner volume. The air outlets are located at the very top of the filter cartridge. The filter cartridge comprises a mesh insert located in the inner volume welded to the head portion. The mesh insert comprises a dome-shaped mesh reinforced by ribs. The bulge of the dome-shaped mesh is oriented downwards in the direction of the treatment media. In use, the dome-shaped mesh comes into contact with the treatment media thereby breaking the surface tension of the water, which reduces the occurrence of mesh blockades. While this solution has been applied successfully in the past, the manufacturing effort of the filter cartridge is high due to the complexity of the mesh insert.

SUMMARY OF THE INVENTION

The problem of the present invention is to improve the flow characteristics of filter cartridges.

This problem is solved by the method for manufacturing a gravity-based filter cartridge.

The method for manufacturing a gravity-based filter cartridge comprises the following steps:
- forming a cup-shaped upper part having a main axis, a first rim at a first axial end, a hole-free section at a second axial end, and at least one water inlet between the hole-free section and the first rim,
- drawing a mesh material over the first rim,
- pushing the mesh material into the cup-shaped upper part towards the hole-free section, thereby forming a dome-shaped mesh,
- fixating the mesh material along a closed path to the first rim,
- fixating the mesh material radially inwards of the closed path to the hole-free section,
- cutting the mesh from the mesh material along a path radially outward of the closed path,
- forming a cup-shaped lower part having a second rim and at least one water outlet,
- inserting filter media into the lower part,
- mounting the upper part onto the lower part with the second rim contacting the first rim.

The steps are preferably executed in the listed order.

In the past the blocking issues of meshes were addressed by trying to remove all air from inside the filter cartridge. For this reason, air outlets were provided at the very top of filter cartridges in the state of the art. The inventors have now found that the blocking issues can be effectively avoided by providing the filter cartridge with a hole-free section at its upper end, where air can accumulate forming an air cushion, and by fixating the mesh material to the hole-free section so that the mesh, which is cut from the mesh material, is at least partially arranged in the area where the air accumulates, thereby explicitly providing a section of the mesh that is not wet during usage of the filter cartridge. Air coming from below the mesh will be able to pass upwards through the part of the mesh that is not wet into the hole-free section easily instead of blocking water trying to pass the mesh in the opposite direction. The flow characteristics of filter cartridges are thereby improved.

The term main axis does not necessarily mean that the filter cartridge or any part of it is rotationally symmetrical. The main axis preferably extends parallel to the gravitational direction.

The upper part preferably comprises a circumferential outer wall that is closed at the second axial end by an end wall, wherein the end wall together with an adjacent section of the outer wall forms the hole-free section. The outer wall can comprise several sections along the main axis X and at least some of these sections may extend perpendicular or at oblique angles to the main axis X. The end wall is preferably, but not necessarily flat. The lower end of the hole-free section is particularly defined by the topmost edge of the water inlets.

The hole-free section preferably comprises a support to which the mesh material is fixated at a distance to the end wall along the main axis X. Alternatively the mesh may also be fixated directly to the end wall. The support ensures that the mesh is spaced apart from the end wall, thereby providing a defined top volume for the air to accumulate and, at the same time, reducing the amount of mesh material that is needed, thus limiting the manufacturing cost of the filter cartridge.

In any case, the mesh material is fixated to the hole-free section at a position axially closer to the end wall than the at least one water inlet. In other words, the mesh material is fixated to the hole-free section axially above the at least one water inlet, in particular above the topmost edge of the at least one water inlet.

In preferred embodiments the support has a flat area perpendicular to the main axis X and the mesh material is fixated to the area. A flat area enables a reliable connection of the mesh material to the support that is easy to manufacture.

The mesh material is preferably fixated to the first rim and/or the hole-free section integrally. "Integrally" means that the connection between the mesh material on one side and the rim and/or the hole-free section on the other side can only be parted by destroying either of the connected elements. Integral connection work without further parts making the manufacturing easy and cost-effective. Such connections are also very reliable, ensuring that the functionality of the filter cartridge is available throughout its lifetime. The mesh material is most preferably fixated to the rim and/or the hole-free section by ultrasonic welding. Ultrasonic welding is particularly preferably in combination with having a flat contact area as described above, since the contact area provides a good place for the sonotrode to be placed upon. Executing both connections in the same way ensures that both connections are likewise durable and reliable and also reduces the overall production cost since the same device for creating the connection (e.g. a sonotrode) may be used.

It is generally possible to fixate the mesh material to the first rim and the hole-free section simultaneously. This limits the production time. However, the mesh material is preferably fixated to the rim and the hole-free section consecutively in order to ensure that the mesh is not tensed too much in between the two connections. Too much tension could cause the connections to break, which is obviously undesirable.

The support is preferably a pin extending from the end wall along the main axis X towards the first axial end. A pin is easy to manufacture and provides an attachment point for the mesh that is easily accessible. Pins of different embodiments may have different cross-sections, in particular circular or x-shaped cross-sections. The pin preferably has a disc portion arranged at its lower end. The disc portion may then comprise the contact area.

The pin preferably has a length L of at least 5 mm (L≥5 mm), and particularly preferred at most 20 mm (L≤20 mm). The length L is measured along the main axis X. A pin of a length L in this range ensures that there is enough space for air coming from the filter cartridge to accumulate in on the one hand while not adding too much to the total height of the filter cartridge.

The pin preferably extends from the end wall to a minimum pin height H1 and the at least one water inlet extends to a maximum inlet height H2, wherein H1>H2. In other words the highest point of the topmost edge of the at least one water inlet is not higher than the lowest point of the pin to which the mesh material is fixated. This arrangement ensures that the water inlets are not blocked by the air accumulating in the top volume.

Turbulences and bubble formation in the filter cartridge will be caused by water entering through the water inlets. To ensure that at no time the water inlets are blocked by the air cushion, the minimum pin height H1 is preferably at least 5 mm greater than the maximum inlet height H2 (H1≥H2+5 mm). Once again to limit the total height of the filter cartridge the minimum pin height is preferably at most 10 mm greater than the maximum inlet height (H1≤H2+10 mm).

In preferred embodiments several water inlets are arranged uniformly around the main axis X. This provides a uniform entry of water into the filter cartridge, further improving the flow characteristics of the filter cartridge.

The mesh material preferably comprises polyethylene terephthalate (PET). In particular, the mesh material consists of PET. PET is relatively hydrophilic material, which is generally good for allowing water to pass through the mesh.

The upper part and the lower part of the filter cartridge are preferably connected to each other integrally, in particular by ultrasonic welding. Once more, this limits the manufacturing cost since the same connecting device (e.g. a sonotrode) can be used.

The lower part and the mesh preferably define a cartridge volume. Said cartridge volume is connected to its surroundings by holes in the mesh and the water outlets of the lower part. The filter media, preferably in particulate form, is arranged in said cartridge volume. The size of the holes in the mesh and the water outlet openings is chosen to prohibit the particles from exiting the filter cartridge.

The filter media inserted into the lower part is preferably ion exchange resin and/or active coal.

Depending on when the mesh is cut from the mesh material during the manufacturing method, some of the features described above with reference to the mesh material may instead be applied to the mesh, in particular if they include steps that are carried out after the mesh has been cut from the mesh material. The same applies vice versa.

The problem of the invention is also solved by a gravity-based filter cartridge having a cup-shaped upper part and a cup-shaped lower part, the upper part having a main axis, a first rim at a first axial end, a hole-free section at a second axial end, and at least one water inlet between the hole-free section and the first rim, the lower part having a second rim and at least one water outlet, wherein filter media is arranged in the lower part, the filter cartridge further comprising a mesh fixated to the upper part along a closed path. The mesh is further fixated to the hole-free section radially inwards of the closed path.

The filter cartridge may have any feature described above with reference to the manufacturing method. Features relating to the mesh material may therefore be applied to the mesh of the filter cartridge instead of the mesh material. For example, while according to the method the mesh material is fixated to the first rim and to the hole-free section, the product, namely the filter cartridge, has a mesh being fixated to the first rim and to the hole-free section.

The problem of the invention is also solved by a gravity-based filtration device having an inlet funnel with a seat as well as a filter cartridge as described above arranged in said seat.

BRIEF DESCRIPTION OF THE DRAWINGS

The invention is described by way of example with reference to the drawings showing the following.

DETAILED DESCRIPTION OF THE INVENTION

Figure 1:
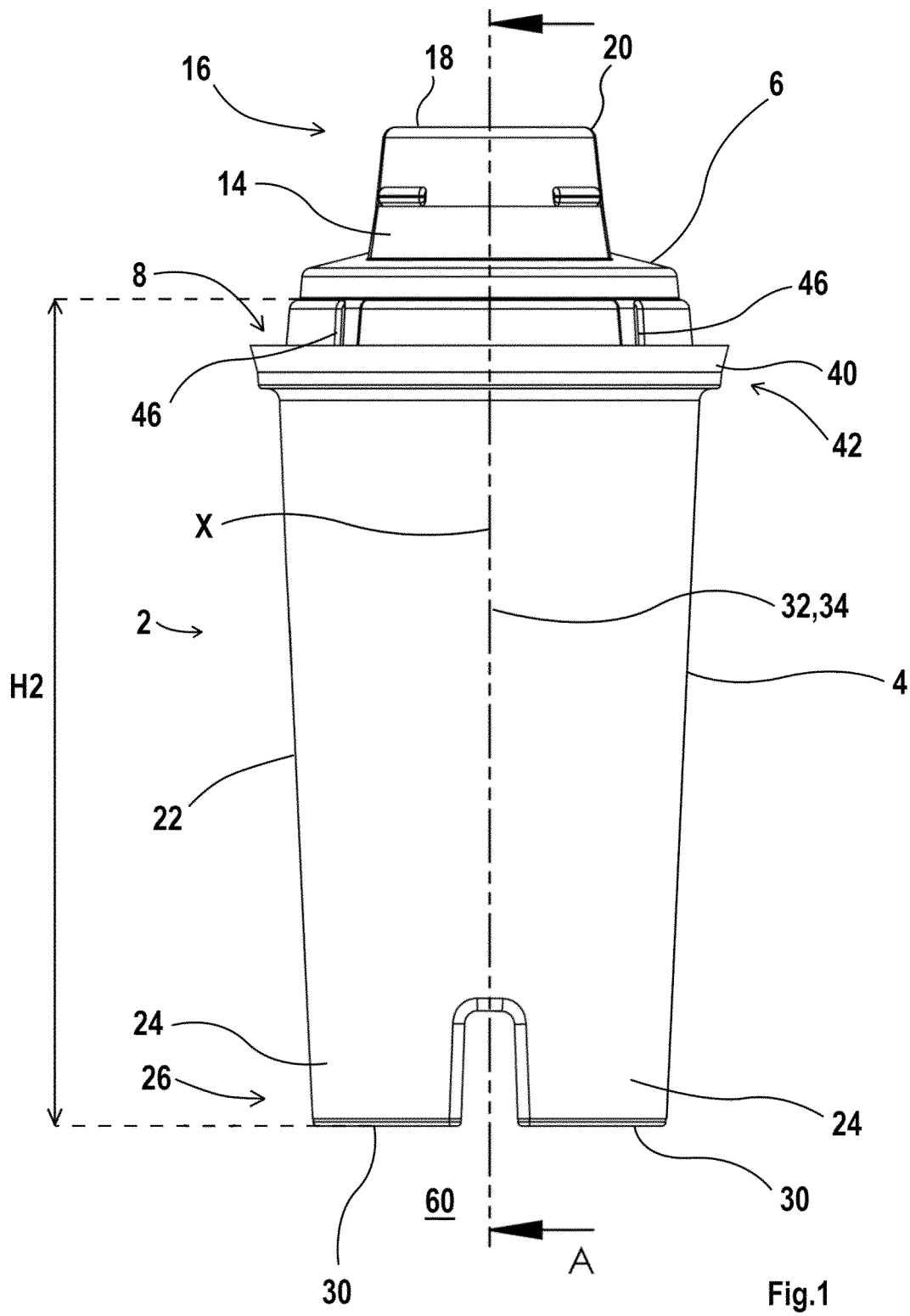
FIG. 1 a side view of a filter cartridge according to the invention.

The gravity-based filter cartridge 2 shown in FIGS. 1 to 4 comprises a cup-shaped lower part 4 and a cup-shaped upper part 6. The upper part 6 is arranged on top of the lower part 4 along a main axis X.

At a first axial end 8 the upper part 6 comprises a first rim 10 having the shape of a ring running around the main axis X. The first rim 10 comprises a first contact area 12 that is generally flat perpendicular to the main axis X and that defines the first axial end 8.

The upper part 6 with its cup-shape is arranged upside down on the lower part 4. The upper part 6 comprises a circumferential outer wall 14 that is closed at a second axial end 16 opposite to the first contact area 12 by an end wall 18. The end wall 18 together with an adjacent section of the outer wall 14 forms a hole-free section 20 of the upper part 6.

The lower part 4 comprises an elongated body 22 that transitions into four feet 24 at a bottom end 26 of the lower part 4. At the bottom end 26 the lower part 4 is closed except for water outlets 28 that are arranged in bottom walls 30 of the feet 24 (see FIG. 4). The feet 24 are separated by grooves 32, of which one groove 32 is shaped differently from the other grooves 32 such that it functions as a positioning groove 34 for correctly aligning the filter cartridge 2 in an inlet funnel (not shown) of a filtration device (not shown).

The lower part 4 has a second rim 40 at an upper end 42. The second rim 40 comprises a generally flat second contact area 44 onto which the first contact area 12 of the upper part 6 is arranged.

Several water inlets 46 are located in the outer wall 14 of the upper part 6 located in axial direction in between the first rim 10 and the hole-free section 20 (see FIG. 1). Water may enter into the upper part 6 via these water inlets 46. In the embodiment shown all water inlets 46 are of a similar shape and are arranged at the same height along the main axis X. The water inlets 46 have their highest point at a maximum inlet height H2 (vertical distance from the bottom walls 30).

Figure 2:
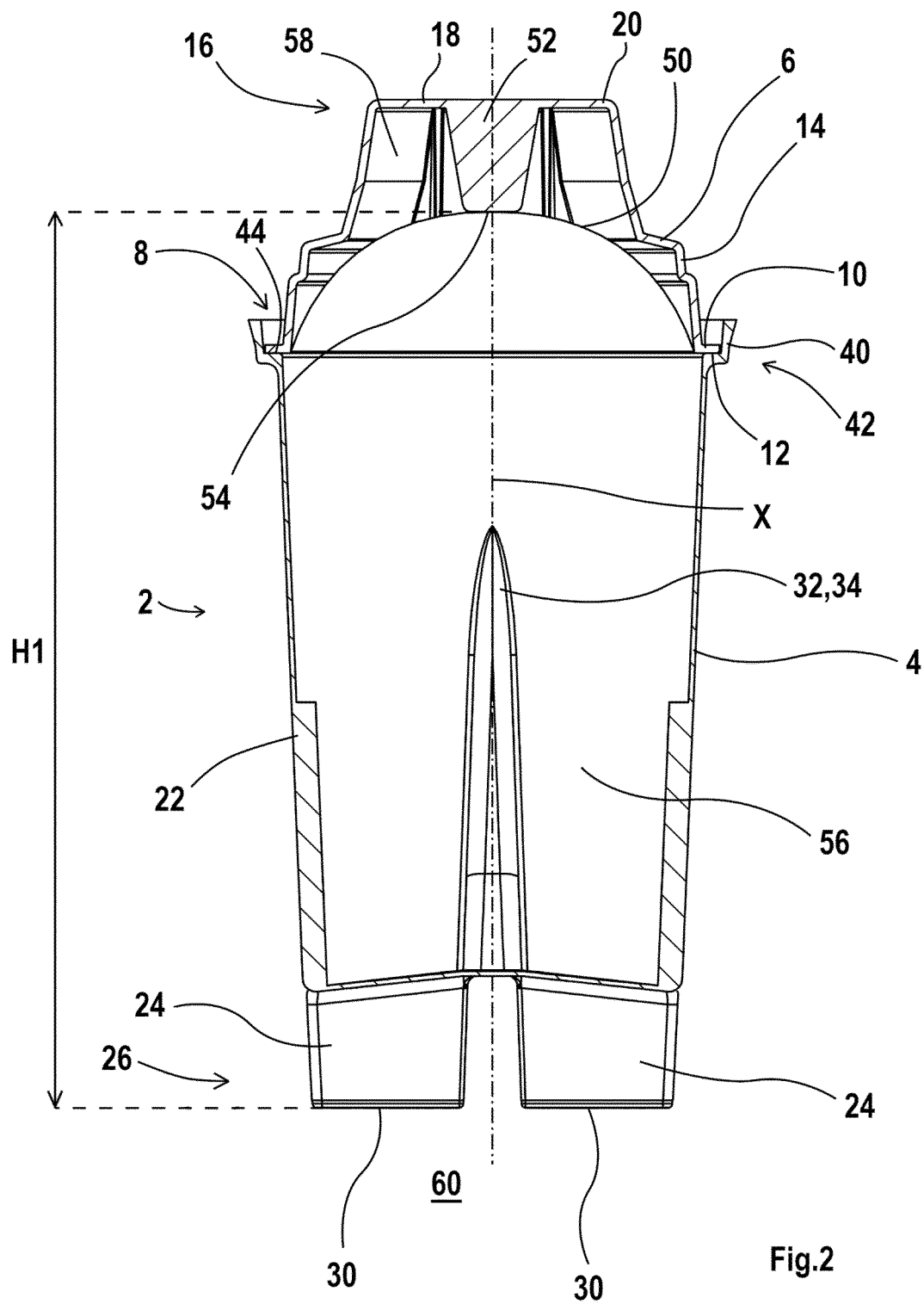
FIG. 2 sectional view A-A of FIG. 1.
Figure 3:
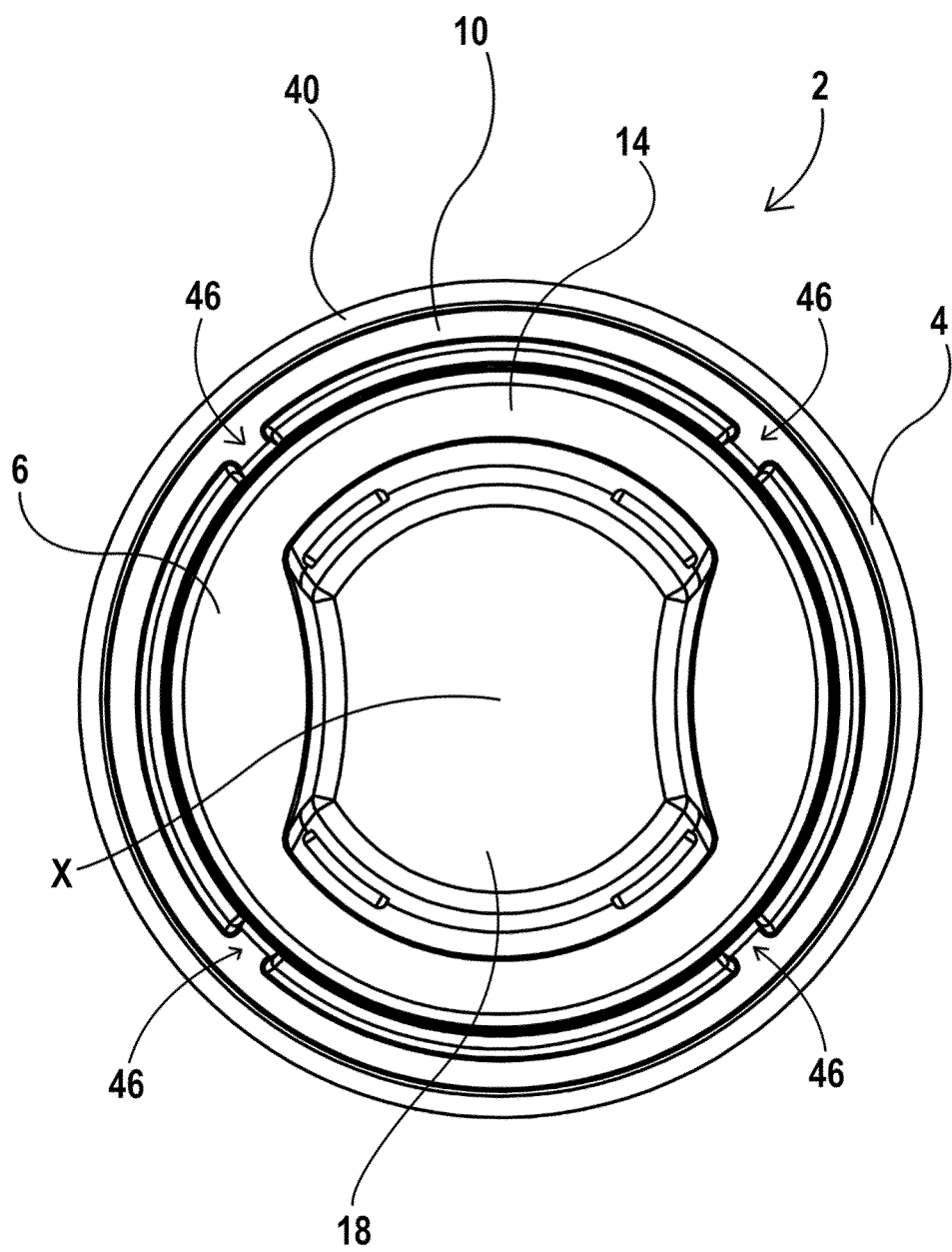
FIG. 3 a top view of the filter cartridge of FIG. 1.
Figure 4:
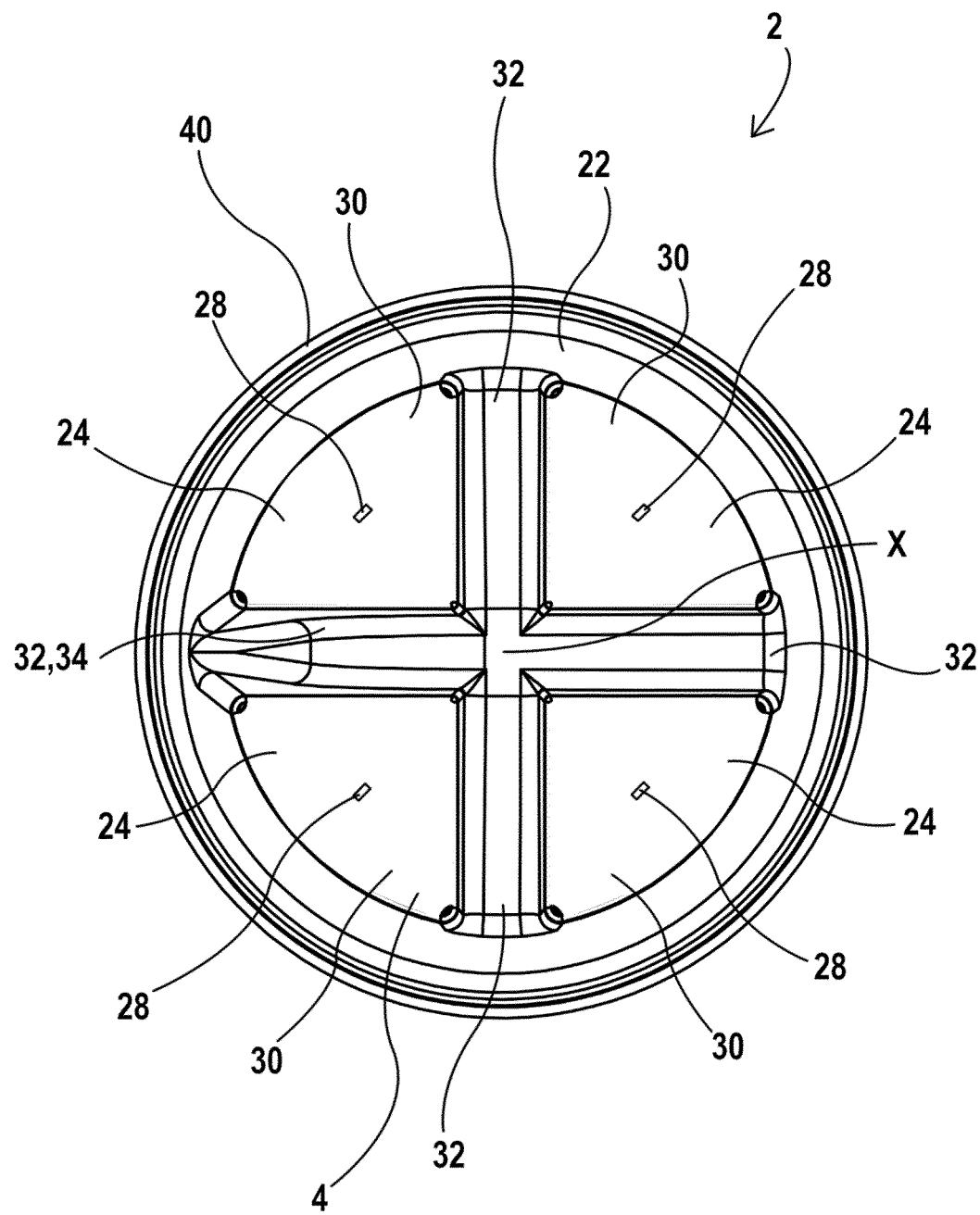
FIG. 4 a bottom view of the filter cartridge of FIG. 1.

The upper part 6 further comprises a mesh 50 that is dome-shaped (see FIG. 2). The mesh 50 is affixed to the first rim 10 along a closed path that extends around the main axis X.

The hole-free section 20 of the upper part 6 further comprises a pin 52 that extends from the end wall 18 along the main axis X towards the first axial end 8. The mesh 50 is affixed to the pin 52 in an area 54 radially inwards of the closed path, at which the mesh 50 is affixed to the first rim 10. The mesh 50 is thus held in a dome-shaped form.

The pin 52 has its lowest point at a minimum pin height H1 (vertical distance from the bottom walls 30, see FIG. 2). The minimum pin height H1 is larger than the maximum inlet height H2. This ensures that the mesh 50 will extend to a region above the maximum inlet height H2. As a result air will be able to pass through the mesh 50 easily and accumulate in the hole-free section 20 thereby not blocking the water inlets 46.

The lower part 4 and the mesh 50 define a cartridge volume 56, in which filter media (not shown) is arranged.

Water entering into the filter cartridge 2 via the water inlets 46 first enter into a top volume 58 defined by the outer wall 14 and the end wall 18 of the upper part 6 together with the mesh 50. The water will then wet the mesh 50 and will additionally pass through the mesh 50 into the cartridge volume 56 defined by the lower part 4 and the mesh 50. Air present in said cartridge volume 56 may escape upwards through the mesh 50 to the top volume 58. Said air will then not block the water from passing through the mesh 50. The water may then be treated by the filter media and may subsequently exit the filter cartridge 2 through the water outlets 28 into a space 60 below.

The embodiment of the filter cartridge 2 shown in the drawings is manufactured as follows: first, the cup-shaped upper part 6 having the main axis X, the first rim 10 at the first axial end 8, the hole-free section 20 at a second axial end 16, and the water inlets 46 between the hole-free section 20 and the first rim 10, is formed by injection-molding. Next, a PET mesh material is drawn over the first rim 10. The mesh material is then pushed into the upper part 6 towards the hole-free section 20, thereby forming the dome-shaped mesh 50. The mesh 50 is then fixated to the first rim 10 along a closed path. Further, the mesh 50 is fixated radially inwards of the closed path to the area 54 of the pin 52 of the hole-free section 20. The mesh 50 is then cut from the mesh material along a path radially outwards of the closed path. The lower part 4 having the second rim 40 and the water outlets 28 is also formed by injection molding. Hereafter, ion exchange resin and active coal (both in granular form) is inserted into the lower part 4 as filter media. The upper part 6 is then mounted upside down onto the lower part with the second rim 40 contacting the first rim 10.

What is claimed is:
1. A method for manufacturing a gravity-based filter cartridge, comprising the following steps:
forming a cup-shaped upper part having a main axis X, a first rim at a first axial end, a hole-free section at a second axial end, and at least one water inlet between the hole-free section and the first rim, wherein the hole-free section comprises a support to which the mesh material is fixated at a distance to an end wall along the main axis X, wherein the support is a pin extending from the end wall along the main axis X towards the first axial end, wherein the pin has a length L of at least 5 mm,
drawing a mesh material over the first rim,
pushing the mesh material into the cup-shaped upper part towards the hole-free section, thereby forming a dome-shaped mesh, fixating the mesh material along a closed path to the first rim, fixating the mesh material radially inwards of the closed path to the hole-free section, cutting the mesh from the mesh material along a path radially outward of the closed path, forming a cup-shaped lower part having a second rim and at least one water outlet, inserting filter media into the lower part, and mounting the upper part onto the lower part with the second rim contacting the first rim.

2. The method according to claim 1, wherein the upper part comprises a circumferential outer wall that is closed at the second axial end by an end wall, wherein the end wall together with an adjacent section of the outer wall forms the hole-free section.

3. The method according to claim 2, wherein the support has a flat area perpendicular to the main axis X and in that the mesh material is fixated to the area.

4. The method according to claim 3, wherein the mesh material is fixated to the first rim and/or the hole-free section integrally, and wherein the mesh material is fixated to the first rim and/or the hole-free section by ultrasonic welding.

5. The method according to claim 4, wherein the mesh material is fixated to the rim and the hole-free section consecutively.

6. The method according to claim 5, wherein the pin has a circular or x-shaped cross-section, and wherein the pin has a length L of at most 20 mm.

7. The method according to claim 6, wherein the mesh material comprises polyethylene terephthalate (PET), and wherein the mesh material is fixated to the hole-free section at a position axially above the at least one water inlet.

8. The method according to claim 1, wherein the support has a flat area perpendicular to the main axis X and in that the mesh material is fixated to the area.

9. The method according to claim 1, wherein the mesh material is fixated to the first rim and/or the hole-free section integrally.

10. The method according to claim 1, wherein the mesh material is fixated to the first rim and/or the hole-free section by ultrasonic welding.

11. The method according to claim 1, wherein the mesh material is fixated to the rim and the hole-free section consecutively.

12. The method according to claim 1, wherein the pin has a circular or x-shaped cross-section.

13. The method according to claim 1, wherein the pin has a length L of at most 20 mm.

14. The method according to claim 1, wherein the mesh material comprises polyethylene terephthalate (PET).

15. The method according to claim 1, wherein the mesh material is fixated to the hole-free section at a position axially above the at least one water inlet.

16. A gravity-based filter cartridge comprising:

a cup-shaped upper part and a cup-shaped lower part, the upper part having a main axis X, a first rim at a first axial end, a hole-free section at a second axial end, and at least one water inlet between the hole-free section and the first rim, the lower part having a second rim and at least one water outlet, wherein the hole-free section comprises a support to which the mesh material is fixated at a distance to an end wall along the main axis X, wherein filter media is arranged in the lower part, the filter cartridge further comprising a mesh fixated to the upper part along a closed path, wherein the mesh is further fixated to the hole-free section radially inwards of the closed path, wherein the support is a pin extending from the end wall along the main axis X towards the first axial end, and wherein the pin has a length L of at least 5 mm.

17. A gravity-based filtration device having an inlet funnel with a seat as well as the filter cartridge according to claim 16 arranged in said seat.

18. A gravity-based filter cartridge comprising:

a cup-shaped upper part and a cup-shaped lower part, the upper part having a main axis X, a first rim at a first axial end, a hole-free section at a second axial end, and at least one water inlet between the hole-free section and the first rim, the lower part having a second rim and at least one water outlet, wherein the hole-free section comprises a support to which the mesh material is fixated at a distance to an end wall along the main axis X, wherein filter media is arranged in the lower part, the filter cartridge further comprising a mesh fixated to the upper part along a closed path, wherein the mesh is further fixated to the hole-free section radially inwards of the closed path.

19. The gravity-based filter cartridge according to claim 18, wherein the support is a pin extending from the end wall along the main axis X towards the first axial end.

20. The gravity-based filter cartridge according to claim 19, wherein the pin has a length L of at least 5 mm, and of at most 20 mm.

* * * * *